(12) United States Patent
Watanabe

(10) Patent No.: US 12,390,725 B2
(45) Date of Patent: Aug. 19, 2025

(54) INFORMATION PROCESSING DEVICE AND COMMUNICATION METHOD

(71) Applicant: Sony Group Corporation, Tokyo (JP)

(72) Inventor: Hidekazu Watanabe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 302 days.

(21) Appl. No.: 18/251,401

(22) PCT Filed: Nov. 9, 2020

(86) PCT No.: PCT/JP2020/041758
§ 371 (c)(1),
(2) Date: May 2, 2023

(87) PCT Pub. No.: WO2022/097303
PCT Pub. Date: May 12, 2022

(65) Prior Publication Data
US 2023/0405457 A1 Dec. 21, 2023

(51) Int. Cl.
*A63F 13/358* (2014.01)
(52) U.S. Cl.
CPC ...... *A63F 13/358* (2014.09); *A63F 2300/534* (2013.01)
(58) Field of Classification Search
CPC .......................... A63F 13/358; A63F 2300/534
USPC .......................................................... 463/42
See application file for complete search history.

(56) References Cited

U.S. PATENT DOCUMENTS

| | | | | |
|---|---|---|---|---|
| 8,613,673 | B2 * | 12/2013 | Perry | A63F 13/358 463/42 |
| 10,075,750 | B2 * | 9/2018 | Gordon | H04N 21/2381 |
| 2006/0111187 | A1 * | 5/2006 | Miyazaki | G06F 1/3271 463/31 |
| 2008/0123582 | A1 * | 5/2008 | Maekawa | H04W 88/10 370/315 |
| 2010/0241692 | A1 * | 9/2010 | Klee | A63F 13/30 709/203 |
| 2015/0067186 | A1 * | 3/2015 | Kuhn | H04N 21/23406 709/231 |
| 2015/0352440 | A1 * | 12/2015 | Hutcheson | A63F 13/34 463/42 |

(Continued)

FOREIGN PATENT DOCUMENTS

| | | |
|---|---|---|
| CN | 111135569 A | 5/2020 |
| JP | 2004-329300 A | 11/2004 |

(Continued)

OTHER PUBLICATIONS

International Search Report and Written Opinion mailed on Jan. 19, 2021, received for PCT Application PCT/JP2020/041758, filed on Nov. 9, 2020, 11 pages including English Translation.

*Primary Examiner* — Allen Chan
(74) *Attorney, Agent, or Firm* — XSENSUS LLP

(57) ABSTRACT

An information processing device (10) provides an application function to a client device (20). The information processing device (10) includes an acquisition unit (161) and a communication unit (140). The acquisition unit (161) acquires characteristic information related to the application function. The communication unit (140) communicates with the client device (20). The communication unit (140) changes processing related to the communication in accordance with the characteristic information.

7 Claims, 10 Drawing Sheets

(56) References Cited

U.S. PATENT DOCUMENTS

2021/0093958 A1* 4/2021 Yong ................ H04N 21/23605

FOREIGN PATENT DOCUMENTS

| JP | 2007-079664 A | 3/2007 |
| JP | 2008-016974 A | 1/2008 |
| JP | 2016-537914 A | 12/2016 |
| WO | 2004/093406 A1 | 10/2004 |

* cited by examiner

FIG.4

| CATEGORY | EXAMPLES OF SUB-CATEGORY |
|---|---|
| SHOOTING | BULLET CURTAIN SHOOTING, FPS(First Person shooter) |
| ACTION | PvP FIGHTING GAME |
| ADVENTURE | VISUAL NOVELS |
| PUZZLE | FALLING BLOCK PUZZLE |
| ROLL PLAYING | MMORPG |
| SIMULATION | STRATEGY GAME, FLIGHT |
| SPORTS | SOCCER, TABLE TENNIS |
| MUSIC GAME | RHYTHM GAME |

FIG.5

| SUB-CATEGORY | LOW LATENCY | LARGE CAPACITY |
|---|---|---|
| FPS(First Person shooter) | High | Mid |
| BULLET CURTAIN SHOOTING | High | Low |
| PvP FIGHTING GAME | High | Mid |
| VISUAL NOVELS | Low | Low |
| FALLING BLOCK PUZZLE | Mid | Low |
| MMORPG | High | High |
| STRATEGY GAME | Low | High |
| TABLE TENNIS GAME | High | Mid |
| RHYTHM GAME | High | Low |

FIG.6

| SUB-CATEGORY | SCENE | LOW LATENCY | LARGE CAPACITY |
|---|---|---|---|
| PvP FIGHTING GAME | MENU | Low | High |
| | PLAY | High | Mid |
| STRATEGY GAME | MENU | Low | Mid |
| | PLAY | Low | High |

FIG.7

| LOW LATENCY | LARGE CAPACITY | SLICE |
|---|---|---|
| High | High | Slice 1 |
| High | Mid | Slice 2 |
| Mid | High | Slice 3 |
| Mid | Mid | Slice 4 |
| High | Low | Slice 5 |
| Low | High | Slice 6 |
| Low | Mid | Slice 7 |
| Mid | Low | Slice 8 |
| Low | Low | Slice 9 |

FIG.8

| SUB-CATEGORY | LOW LATENCY | LARGE CAPACITY | SLICE | BUFFER AMOUNT |
|---|---|---|---|---|
| FPS(First Person shooter) | High | Mid | Slice 2 | SMALL |
| BULLET CURTAIN SHOOTING | High | Low | Slice 5 | SMALL |
| PvP FIGHTING GAME | High | Mid | Slice 2 | SMALL |
| VISUAL NOVELS | Low | Low | Slice 9 | SMALL |
| FALLING BLOCK PUZZLE | Mid | Low | Slice 8 | MIDDLE |
| MMORPG | High | High | Slice 1 | SMALL |
| STRATEGY GAME | Low | High | Slice 6 | LARGE |
| TABLE TENNIS GAME | High | Mid | Slice 2 | SMALL |
| RHYTHM GAME | High | Low | Slice 5 | SMALL |

FIG.9

| LOW LATENCY | LARGE CAPACITY | MULTIPLE CONNECTION | SLICE |
|---|---|---|---|
| Low | Low | High | Slice 10 |

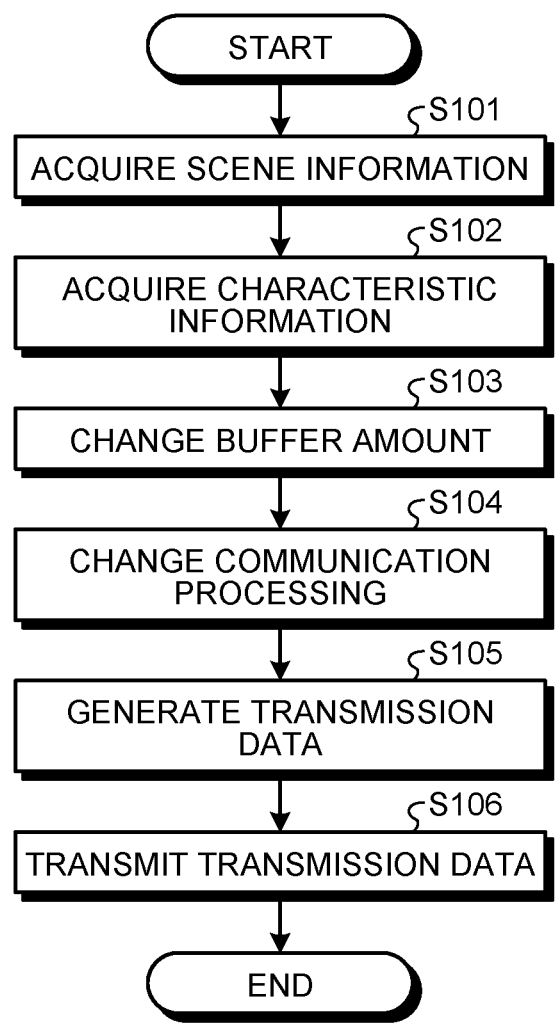

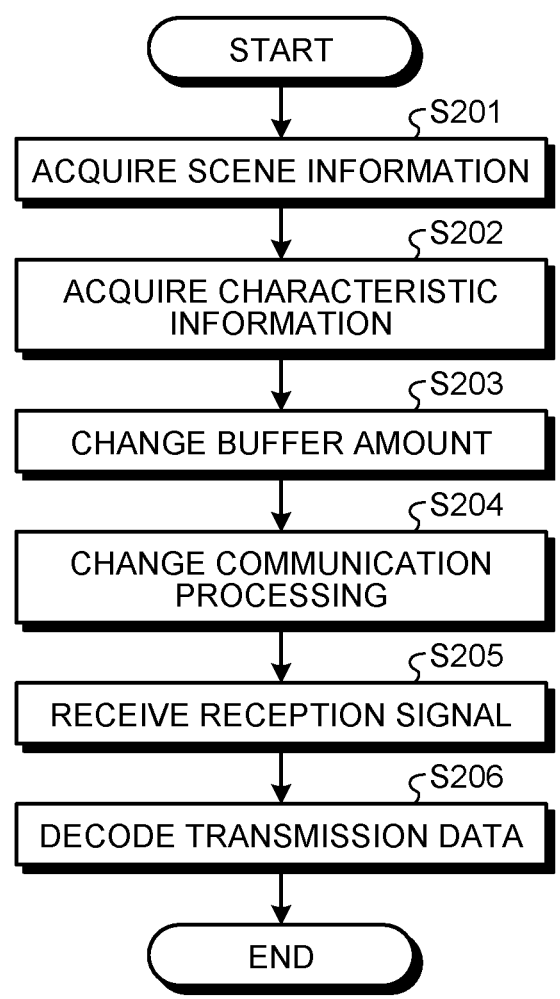

INFORMATION PROCESSING DEVICE AND COMMUNICATION METHOD

CROSS-REFERENCE TO RELATED APPLICATION

The present application is based on PCT filing PCT/JP2020/041758, filed Nov. 9, 2020, the entire contents of which are incorporated herein by reference.

FIELD

The present disclosure relates to an information processing device and a communication method.

BACKGROUND

Conventionally, there has been a wireless communication technology of exchanging various data using wireless communication. For example, in recent years, there have been increasing quantities of applications that access a mobile network game from a terminal device such as a smartphone via a wireless network. There is known a technique of performing rendering on a three-dimensional model into two-dimensional data when such an application transmits an image to the terminal device. In such a technology, the bit rate is intensively allocated to a user's object-of-interest in a screen, thereby transmitting an image with high image quality to the terminal device while reducing a processing load on the terminal device.

CITATION LIST

Patent Literature

Patent Literature 1: JP 2007-79664 A

SUMMARY

Technical Problem

For example, when providing a service of a network game, there is a demand for quality corresponding to the type of game, such as low latency and multiple access involving a large quantity of players participating in the game at the same time, rather than high image quality. However, it has been difficult, in network games, to provide a stable quality service from the viewpoint of latency and throughput. It is desirable to provide a service with stable quality even when a communication environment changes depending on conditions such as a use status of a communication resource and the quantity of terminals to be simultaneously connected.

In view of this, the present disclosure proposes a technology that contributes to achievement of provision of a service with more stable quality.

Note that the above problem or target is merely one of a plurality of problems or targets that can be solved or achieved by a plurality of embodiments disclosed in the present specification.

Solution to Problem

According to the present disclosure, an information processing apparatus is provided. The information processing device provides an application function to a client device. The information processing device includes an acquisition unit and a communication unit. The acquisition unit acquires characteristic information related to the application function. The communication unit communicates with the client device. The communication unit changes processing related to the communication in accordance with the characteristic information.

BRIEF DESCRIPTION OF DRAWINGS

FIG. 4 is a table illustrating an example of service types according to the embodiment of the present disclosure.

FIG. 5 is a table illustrating an example of characteristic information stored in a storage unit according to the embodiment of the present disclosure.

FIG. 6 is a table illustrating another example of characteristic information stored in a storage unit according to the embodiment of the present disclosure.

FIG. 7 is a table illustrating an example of communication control information stored in the storage unit according to the embodiment of the present disclosure.

FIG. 8 is a table illustrating another example of characteristic information stored in the storage unit according to the embodiment of the present disclosure.

FIG. 9 is a table illustrating another example of characteristic information stored in the storage unit according to the embodiment of the present disclosure.

FIG. 12 is a flowchart illustrating a flow of communication processing executed by the information processing device according to the embodiment of the present disclosure.

FIG. 13 is a flowchart illustrating a flow of communication processing executed by a terminal device 20 according to the embodiment of the present disclosure.

DESCRIPTION OF EMBODIMENTS

Figure 1:
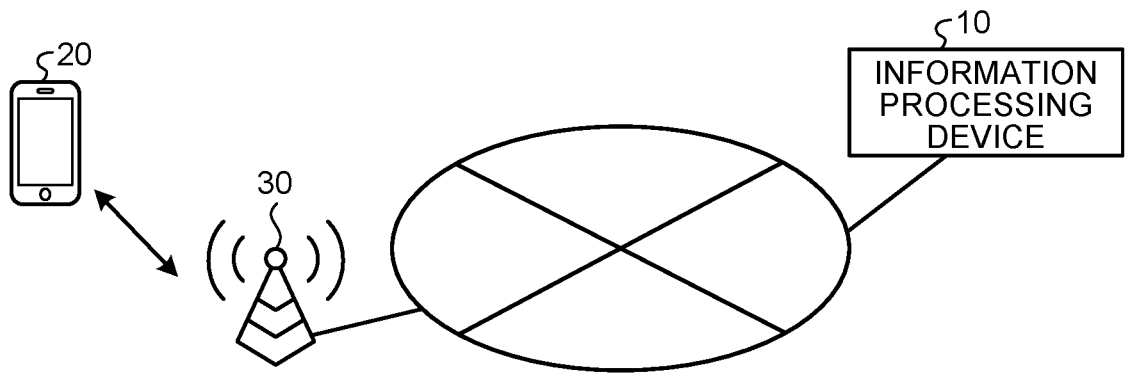
FIG. 1 is a diagram illustrating an overview of a proposed technology of the present disclosure.

Hereinafter, embodiments of the present disclosure will be described in detail with reference to the accompanying drawings. Note that redundant descriptions will be omitted from the present specification and the drawings by assigning the same reference signs to components having substantially the same functional configuration.

Furthermore, in the present specification and the drawings, similar components in the embodiments may be distinguished by adding different alphabets after the same reference numerals. However, when there is no need to particularly distinguish similar components from each other, only the same reference numeral is assigned.

One or more embodiments (including examples and modifications) described below can each be implemented independently. On the other hand, at least some of the plurality of embodiments described below may be appropriately combined with at least some of other embodiments.

The plurality of embodiments may include novel features different from each other. Accordingly, the plurality of embodiments can contribute to achieving or solving different objects or problems, and can exhibit different effects.

Note that the description will be provided in the following order.

1. Introduction
1.1. Overview of proposed technology
2. Configuration example of information processing system
2.1. Information processing system
2.2. Information processing device
2.3. Terminal device
3. Communication processing
3.1. Communication processing by information processing device
3.2. Communication processing by terminal device
4. Other embodiments
5. Supplementary notes

1. INTRODUCTION

1.1. Overview of Proposed Technology

First, an overview of a proposed technology according to the present disclosure will be described. FIG. 1 is a diagram illustrating an overview of the proposed technology of the present disclosure. The proposed technology according to the present disclosure is implemented in an information processing system illustrated in FIG. 1. As illustrated in FIG. 1, the information processing system includes an information processing device 10, a terminal device 20, and a base station device 30.

The information processing device 10 is a game server, for example, and provides a service such as a game to the terminal device 20 via the base station device 30. The information processing device 10 transmits a moving image such as a game image to the terminal device 20, for example.

The terminal device 20 may be, for example, a smartphone, a PC, or a game device. The terminal device 20 displays the moving image acquired from the information processing device 10 on a display unit of the terminal device 20 or a display device connected to the terminal device 20.

The base station device 30 is a wireless communication device that performs wireless communication with the terminal device 20. The base station device 30 is, for example, a device corresponding to a radio base station (Node B, eNB, gNB, etc.), and provides a cellular communication service such as New Radio (NR) to the terminal device 20. The base station device 30 may be a radio relay station. The base station device 30 may be an on-road base station device such as a Road Side Unit (RSU). Furthermore, the base station device 30 may be an optical link device referred to as a Remote Radio Head (RRH).

The base station device 30 is connected to the information processing device 10 via a network, for example, and transmits information related to a service provided by the information processing device 10, such as a moving image of a game, to the terminal device 20. Furthermore, the base station device 30 provides game operation information and the like on the terminal device to the information processing device 10 via a network. In this manner, the information processing device and the terminal device 20 transmit and receive information via the base station device 30, making it possible for the terminal device 20 to receive provision of a service such as a cloud game from the information processing device 10, for example.

Although FIG. 1 illustrates an example in which the terminal device 20 and the information processing device 10 are connected by wireless communication via the base station device 30, the terminal device 20 and the information processing device 10 may be connected by wired communication via a network, for example.

In this manner, in recent years, as games of a smartphone and a PC, there are more network games connected to a game server (information processing device 10) via a network rather than a stand-alone game played within the terminal device 20.

In order to ensure usability on a network game, it is important to perform stable communication regardless of whether it is wired or wireless communication. However, it is not easy to obtain a stable communication environment. For example, depending on the use status of the network or the like, there may be a sudden decrease in communication band availability or deterioration in the responsiveness. In this manner, even when the communication status changes, it is important to adapt to the change in order to improve the operability and usability of the game.

Here, the 5G, which has been partially started in service, has three features of large capacity, low latency, and multiple access. Satisfying these three features in a network game, for example, will make it possible to improve operability and usability of the game.

However, it is difficult, in an actual wireless communication environment, to satisfy all of these three features at the same time. This similarly applies not merely to 5G but also to other wireless communication environments such as LTE, as well as wired communication environments.

For example, in a game communication environment using 5G, a certain game is expected to satisfy a low latency which is a feature of 5G. On the other hand, in another game, it is expected to satisfy a large capacity (high quality) which is a feature of 5G. In this manner, in a game communication environment in which many players play various games, it is considered difficult to simultaneously maintain all the features required in each game. For example, it may be difficult to simultaneously satisfy, in all games, low latency and large capacity required in each of the games.

Therefore, in the technology of the present disclosure, the communication device (for example, the information processing device 10 or the terminal device 20) performs communication control in accordance with characteristic information (for example, low latency, large capacity, or the like) of the game.

Normally, in a game server, communication is performed without considering characteristics required for a game, and thus, communication control according to the nature of the game is not performed.

In this regard, the communication device according to the technology of the present disclosure performs communication control according to the characteristic information of the game, making it possible for the communication device to perform communication satisfying the characteristics (for example, a low latency, a large capacity, or the like) required for the game. This makes it possible for the communication device to provide a game service with a more stable quality, leading to further improvement of the operability and usability of the game.

2. CONFIGURATION EXAMPLE OF INFORMATION PROCESSING SYSTEM

<2.1. Information Processing System>

Figure 2:
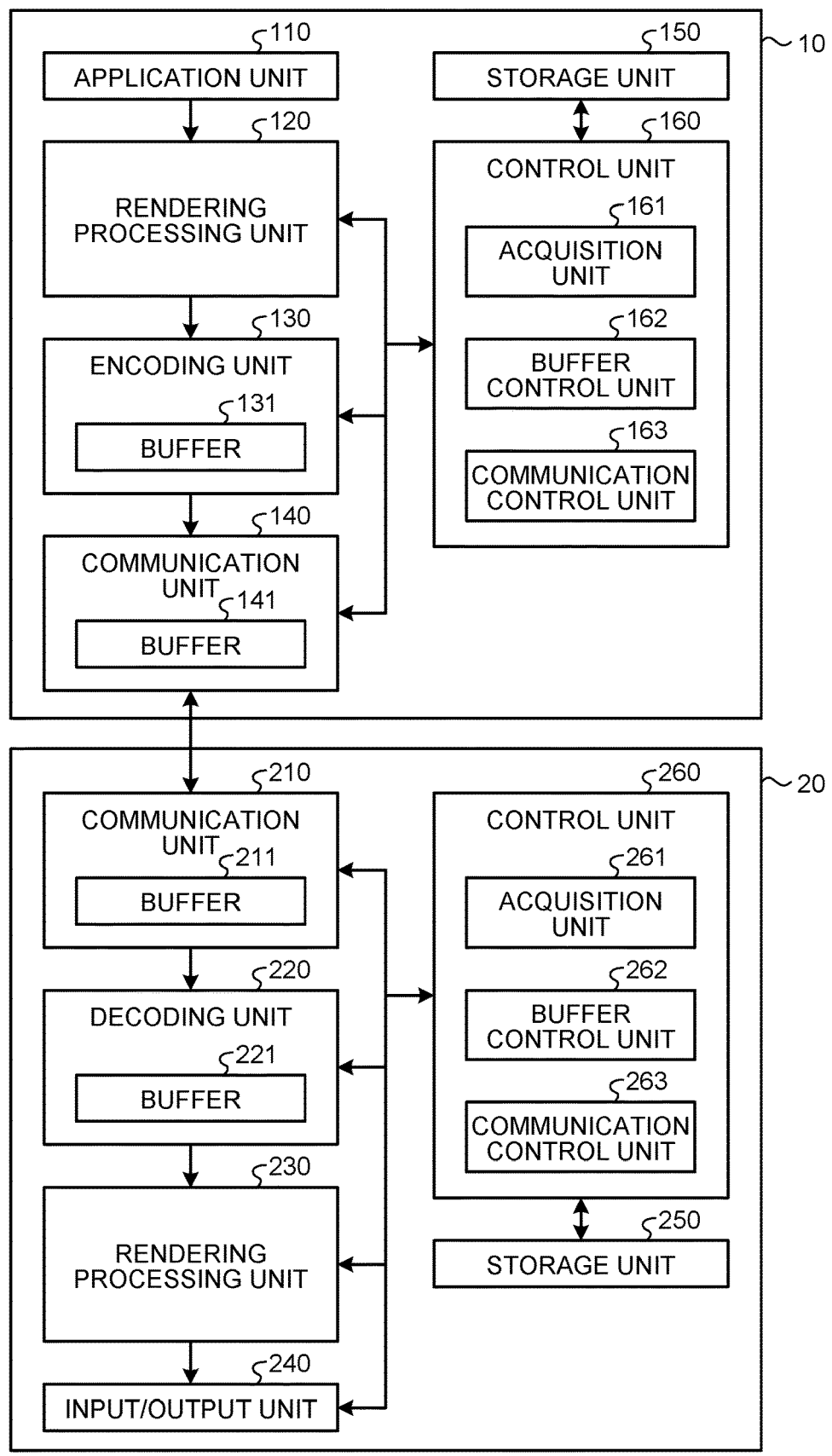
FIG. 2 is a diagram illustrating a configuration example of an information processing system according to an embodiment of the present disclosure.

FIG. 2 is a diagram illustrating a configuration example of an information processing system according to the embodiment of the present disclosure. As described above, the information processing system includes the information processing device 10 and the terminal device Although not illustrated in FIG. 2, the information processing system may include the base station device 30 as illustrated in FIG. 1. Alternatively, when the information processing device 10 is a mobile edge computing (MEC) device, the information processing device 10 may be disposed as a server in the base station device 30.

[Information Processing Device 10]

As illustrated in FIG. 2, the information processing device 10 is a client server that provides an application function to a client device. The information processing device 10 is a game server that provides a game service as an application function, for example, and transmits moving image data to be displayed as a game screen to the terminal device 20. Furthermore, the information processing device receives information (scene information) related to a scene being displayed as a game screen from the terminal device 20. The scene information is, for example, information indicating a scene of a game, such as whether the game screen is a menu screen or a play screen.

The information processing device 10 includes an application unit 110, a rendering processing unit 120, an encoding unit 130, a communication unit 140, a storage unit 150, and a control unit 160.

(Application Unit 110)

The application unit 110 includes one or more applications that provide a service to the terminal device 20 based on information acquired by the control unit 160. Implemented by the program operating on a central processing unit (CPU), for example, the application unit 110 causes the terminal device 20 to display a moving image to provide a game service to a user of the terminal device 20.

More specifically, the application unit 110 controls the operation of the game. For example, the application unit 110 outputs the moving image data to the rendering processing unit 120 based on the data acquired from the terminal device 20.

The service provided by the application unit 110 is not limited to the game service, and may be, for example, various services such as a video viewing service.

(Rendering Processing Unit 120)

The rendering processing unit 120 is a drawing unit that performs rendering processing of a moving image to be displayed on the terminal device 20. The rendering processing unit 120 performs processing of generating image data to be displayed as a game screen. In accordance with instructions from the application unit 110 and the control unit 160, the rendering processing unit 120 performs rendering of a scene image of a game at a predetermined rendering resolution and a frame rate.

The rendering processing unit 120 includes a processor such as a graphics processing unit (GPU). The processor operates according to a predetermined program, enabling generation of moving image information. In a case where the rendering processing unit 120 includes a plurality of GPUs, the rendering processing unit 120 appropriately divides information related to image generation, and performs image processing in parallel by the plurality of GPUs.

(Encoding Unit 130)

The encoding unit 130 encodes and thereby compresses the image data generated by the rendering processing unit 120, and outputs a compressed bit stream (hereinafter, also referred to as compressed data) to the communication unit 140. The encoding unit 130 generates compressed data in accordance with an instruction from the control unit 160.

The encoding unit 130 illustrated in FIG. 2 includes a buffer 131. The encoding unit 130 temporarily stores compressed data and the like in the buffer 131 and performs encoding processing.

(Communication Unit 140)

The communication unit 140 is a communication interface (I/F) used for communication with an external device. The communication unit 140 is implemented by a network interface card (NIC), for example. For example, the communication unit 140 communicates with a core network to which the base station device 30 (refer to FIG. 1) is connected. The communication unit 140 converts a scene image encoded by the encoding unit 130 into a transmission signal and transmits the obtained transmission signal to the terminal device 20. Furthermore, the communication unit 140 receives the scene information and the service information related to the game service from the terminal device 20, and notifies the control unit 160 of the reception result. Furthermore, the communication unit 140 transmits characteristic information generated based on the scene information and the service information to the terminal device 20.

The communication unit 140 illustrated in FIG. 2 includes a buffer 141. The communication unit 140 temporarily stores communication data and the like in the buffer 141 and performs communication processing.

(Storage Unit 150)

The storage unit 150 is a data readable/writable storage device such as DRAM, SRAM, a flash drive, and a hard disk. The storage unit 150 functions as a storage means in the information processing device 10. The storage unit 150 stores control information and the like used for communication control and buffer control performed by the control unit 160 described below.

Although FIG. 2 illustrates a configuration in which the encoding unit 130 and the communication unit 140 have buffer memory as the buffers 131 and 141, respectively, the configuration is not limited thereto. For example, the encoding unit 130 and the communication unit 140 may perform processing using a part of the storage unit 150 as the buffers 131 and 141.

(Control Unit 160)

The control unit 160 controls individual portions of the information processing device 10. The control unit 160 is implemented by execution of programs stored inside the information processing device 10 by a central processing unit (CPU), a micro processing unit (MPU), or the like, using random access memory (RAM) or the like, as a working area. Furthermore, the control unit 160 is actualized by, for example, an integrated circuit such as an application specific integrated circuit (ASIC) or a field programmable gate array (FPGA).

The control unit 160 includes an acquisition unit 161, a buffer control unit 162, and a communication control unit 163, and implements or executes functions and operations of information processing described below. The internal configuration of the control unit 160 is not limited to the configuration illustrated in FIG. 2, and may be any other configuration as long as it is a configuration that performs information processing described below.

Furthermore, the connection relationship of the processing units included in the control unit 160 is not limited to the connection relationship illustrated in FIG. 2, and may be a different connection relationship.

(Acquisition Unit 161)

The acquisition unit 161 acquires information (characteristic information) related to the characteristic of the game. The acquisition unit 161 acquires information related to the game service and information related to scenes of the game service from the terminal device 20, and acquires the characteristic information from the storage unit 150 based on the acquired information.

The characteristic information is information related to a characteristic required when providing a game service, for example. The characteristic information includes information indicating a required characteristic among low latency, large capacity, and multiple access, for example. The characteristic information is set in units of services provided by the application unit 110, for example. Furthermore, the characteristic information may be set for each scene of the service. Details of the characteristic information will be described below.

(Buffer Control Unit 162)

The buffer control unit 162 controls the buffers 131 and 141 of the respective units based on the characteristic information acquired by the acquisition unit 161. The buffer control unit 162 controls the buffer amounts of the buffers 131 and 141 based on the characteristic information.

(Communication Control Unit 163)

The communication control unit 163 controls communication processing performed by the communication unit 140 based on the characteristic information acquired by the acquisition unit 161. Furthermore, the communication control unit 163 controls processing performed by the encoding unit 130, such as processing regarding a frame rate and an encoding rate.

[Terminal Device 20]

The terminal device 20 is a client device (information processing device) which receives provision of an application function from the information processing device which is a client server. The terminal device 20 receives provision of a game service as an application function, for example.

The terminal device 20 receives moving image data related to the game transmitted from the information processing device 10, and displays the received moving image data. The terminal device 20 determines a scene of a game according to a user's operation on the game and transmits scene information related to the determined scene to the information processing device 10.

The terminal device 20 includes a communication unit 210, a decoding unit 220, a rendering processing unit 230, an input/output unit 240, a storage unit 250, and a control unit 260.

(Communication Unit 210)

The communication unit 210 is a communication interface (I/F) used for communication with an external device. The communication unit 210 is implemented by a network interface card (NIC), for example. For example, the communication unit 210 is connected to a core network by performing wireless communication with the base station device 30 (refer to FIG. 1). The communication unit 210 receives the moving image data of the game from the information processing device 10. The communication unit 210 transmits the scene information and the service information related to the game service to the information processing device 10. The communication unit 210 receives the characteristic information from the information processing device 10.

The communication unit 210 includes a buffer 211, temporarily stores data received from the information processing device 10 in the buffer, and performs reception processing. The communication unit 210 temporarily stores data to be transmitted to the information processing device 10 in a buffer and performs transmission processing.

(Decoding Unit 220)

The decoding unit 220 decodes moving image data received by the communication unit 210. The decoding unit 220 includes a buffer 221, temporarily stores moving image data, and performs decoding processing.

(Rendering Processing Unit 230)

The rendering processing unit 230 performs rendering of the moving image data decoded by the decoding unit 220 and controls to display the rendered moving image on a display (not illustrated) of the input/output unit 240.

(Input/Output Unit 240)

The input/output unit 240 includes, for example, a display device (not illustrated) such as a display and an input device (not illustrated) such as an operation device (controller). The input/output unit 240 displays the moving image data rendered by the rendering processing unit 230 on the display. The input/output unit 240 detects an operation on the game by the user via the input device.

(Storage Unit 250)

The storage unit 250 is a data readable/writable storage device such as DRAM, SRAM, a flash drive, and a hard disk. The storage unit 250 functions as a storage means in the terminal device 20. The storage unit 250 stores control information and the like used for communication control and buffer control performed by the control unit 260 described below.

Although FIG. 2 illustrates a configuration in which the communication unit 210 and the decoding unit 120 have buffer memory as the buffers 211 and 221, respectively, for example, the configuration is not limited thereto. For example, the communication unit 210 and the decoding unit 120 may perform processing using a part of the storage unit 250 as the buffers 211 and 221.

(Control Unit 260)

The control unit 260 controls individual portions of the terminal device 20. The control unit 260 is implemented by execution of programs stored inside the terminal device 20 by a central processing unit (CPU), a micro processing unit (MPU), or the like, using random access memory (RAM) or the like, as a working area. Furthermore, the control unit 260 is actualized by, for example, an integrated circuit such as an application specific integrated circuit (ASIC) or a field programmable gate array (FPGA).

The control unit 260 includes an acquisition unit 261, a buffer control unit 262, and a communication control unit 263, and implements or executes functions and operations of information processing described below. The internal configuration of the control unit 260 is not limited to the configuration illustrated in FIG. 2, and may be any other configuration as long as it is a configuration that performs information processing described below. Furthermore, the connection relationship of the processing units included in the control unit 260 is not limited to the connection relationship illustrated in FIG. 2, and may be a different connection relationship.

(Acquisition Unit 261)

The acquisition unit 261 acquires information (characteristic information) related to the application function (characteristic of the game). The acquisition unit 261 acquires service information related to the game service and scene information related to the scene of the game service from the input/output unit 240 and the storage unit 250. By notifying the information processing device of the acquired information, the acquisition unit 261 acquires characteristic information from the information processing device 10.

(Buffer Control Unit 262)

The buffer control unit 262 controls the buffers 211 and 221 of the respective units based on the characteristic information acquired by the acquisition unit 261. The buffer control unit 262 controls the buffer amounts of the buffers 211 and 221 based on the characteristic information.

(Communication Control Unit 263)

The communication control unit 263 controls communication processing performed by the communication unit 210 based on the characteristic information acquired by the acquisition unit 261. Furthermore, the communication control unit 263 controls processing performed by the decoding unit 220, such as processing of a frame rate and a decoding rate.

<2.2. Information Processing Device>

Figure 3:
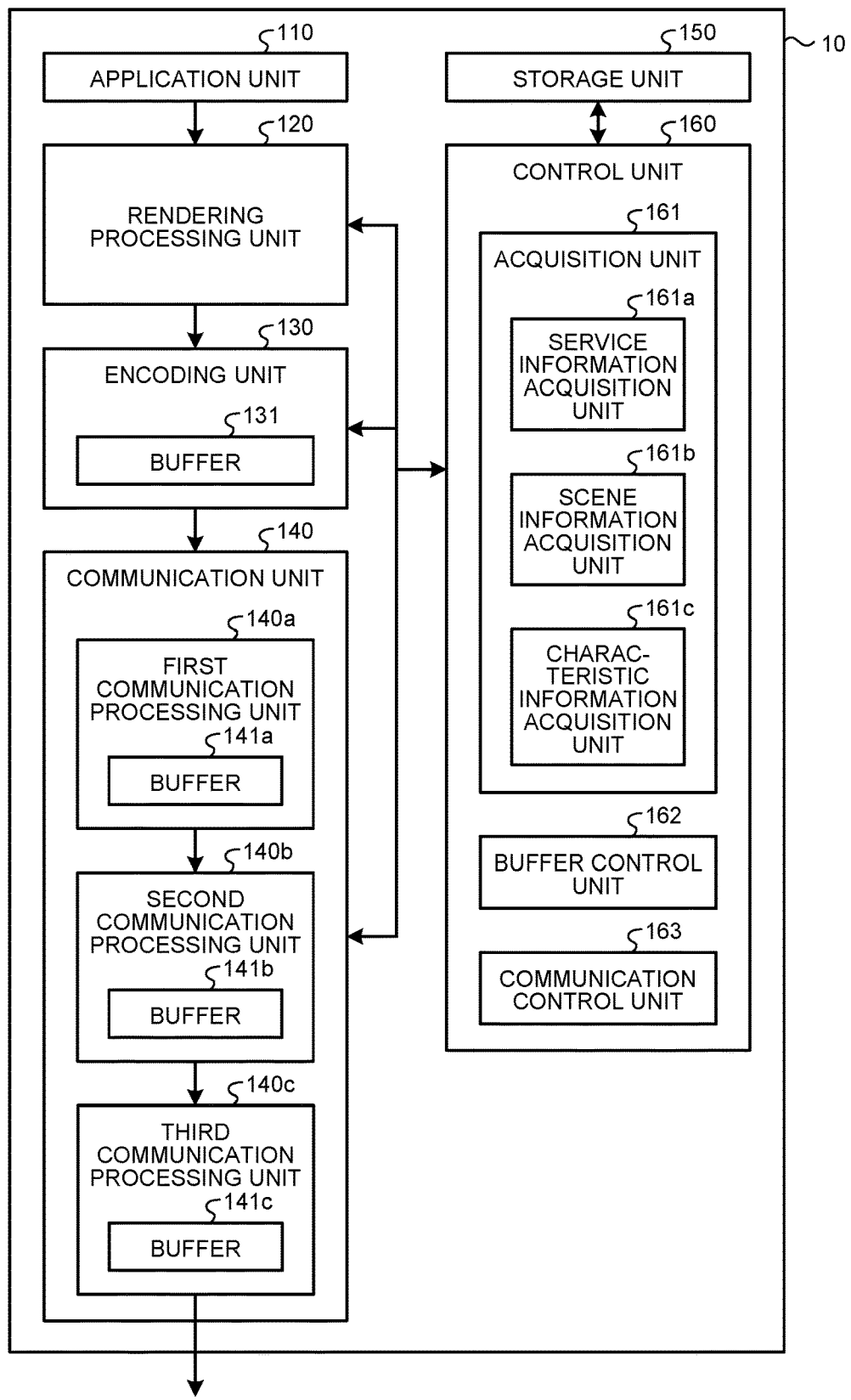
FIG. 3 is a diagram illustrating a configuration example of an information processing device according to the embodiment of the present disclosure.

Next, details of the information processing device 10 will be described. FIG. 3 is a diagram illustrating a configuration example of the information processing device according to the embodiment of the present disclosure.

(Application Unit 110)

The application unit 110 of the information processing device 10 is an application that provides a game service, for example.

FIG. 4 is a table illustrating an example of service types according to the embodiment of the present disclosure. In a case where the application unit 110 provides a game service, the type of the game service can be specified by a category and a sub-category as illustrated in FIG. 4, for example.

For example, the category corresponds to a large classification that classifies services such as "shooting" and "action". Services included in the category "shooting" are classified into small categories such as "bullet curtain shooting" and "first person shooter (FPS)" as sub-categories, for example.

(Storage Unit 150)

Returning to FIG. 3. The storage unit 150 stores the game service provided by the application unit 110 and the characteristic information in association with each other.

FIG. 5 is a table illustrating an example of characteristic information stored in the storage unit 150 according to the embodiment of the present disclosure. As illustrated in FIG. 5, the storage unit 150 stores the sub-category of the game service and the priority of the characteristic information in association with each other. The characteristic information includes, for example, information related to the communication quality characteristic (low-latency characteristic or large-capacity characteristic) required for the service and information related to the characteristic (multiple access characteristic) according to the quantity of terminals to which the service is provided.

For example, the storage unit 150 stores the low-latency characteristic and the large-capacity characteristic as the characteristic information in association with the sub-category of the game. For example, in the sub-category "FPS", the priority of the low-latency characteristic is high (High), and the priority of the large-capacity characteristic is middle (Mid). On the other hand, in the sub-category "strategy game", the priority of the low-latency characteristic is low (Low), and the priority of the large-capacity characteristic is high (High).

The storage unit 150 may store the service scene and the characteristic information in association with each other. FIG. 6 is a table illustrating another example of characteristic information stored in the storage unit 150 according to the embodiment of the present disclosure. As illustrated in FIG. 6, the storage unit 150 stores the scene and the priority of the characteristic information in association with each other for each sub-category of the game service.

For example, the storage unit 150 stores characteristic information for each menu scene and each play scene as a scene. In the "menu" scene of the sub-category "PvP fighting game", the priority of the low-latency characteristic is low (Low), and the large-capacity characteristic is high (High). Even in the same sub-category of "PvP fighting game", in a case where the scene is "play", the priority of the low-latency characteristic is high (High), and the priority of the large-capacity characteristic is middle (Mid).

Although this is the description of the case where the storage unit 150 stores the priority of the characteristic information, the object to be stored is not limited thereto. For example, the storage unit 150 may store the characteristic information most required for the game service. In this case, the storage unit 150 stores, for example, sub-category "FPS" and "low latency" in association with each other, and stores "strategy game" and "large capacity" in association with each other.

Furthermore, the storage unit 150 stores control information used for control by the control unit 160. The control information includes communication control information used for communication control and buffer control information used for buffer control.

The storage unit 150 stores characteristic information and control information in association with each other. FIG. 7 is a table illustrating an example of communication control information stored in the storage unit 150 according to the embodiment of the present disclosure. FIG. 7 illustrates a case where the storage unit 150 stores information related to a network slice as the communication control information.

For example, in a case where the priority of the low-latency characteristic is high (High) and the priority of the large-capacity characteristic is low (Low), the storage unit 150 stores "Slice 5" as the corresponding network slice.

Note that the storage unit 150 stores, as the communication control information, a frame rate, an encoding rate, an encoding method, a communication protocol type, and the like in association with the characteristic information, in addition to the information related to the network slice. In addition, the storage unit 150 stores the buffer amount and the characteristic information in association with each other as the buffer control information.

The storage unit 150 may store the game service, the characteristic information, and the control information in association with each other. FIG. 8 is a table illustrating another example of characteristic information stored in the storage unit 150 according to the embodiment of the present disclosure. In the example illustrated in FIG. 8, the storage unit 150 stores the sub-category of the game service, the priority of the characteristic information, the communication control information, and the buffer control information in association with each other. FIG. 8 illustrates a case where the storage unit 150 stores information related to the network slice as the communication control information and stores information related to the buffer amount as the buffer control information.

For example, in FIG. 8, the sub-category "FPS" has a high low-latency characteristic (High), a middle large-capacity characteristic (Mid), a network slice is "Slice 2", and a buffer amount is "small". In addition, the sub-category "strategy game" has a low-latency characteristic (Low) and a high large-capacity characteristic (High). In the sub-category "strategy game", the network slice used is "Slice 6", and the buffer amount is "large".

In this manner, the storage unit 150 stores characteristic information corresponding to the service to be provided to the terminal device 20. In addition, the storage unit 150 stores control information corresponding to the characteristic information. This makes it possible for the information processing device 10 to perform communication control and buffer control according to the characteristic information required for the service.

Although the storage unit 150 stores the low-latency characteristic and the large-capacity (high image quality) characteristic as the characteristic information, the object to be stored is not limited thereto. For example, the storage unit 150 may store the multiple-access characteristic as the characteristic information. For example, the priority of the multiple-access characteristic is high in a game in which a large quantity of players participate at the same time.

FIG. 9 is a table illustrating another example of characteristic information stored in the storage unit 150 according to the embodiment of the present disclosure. In FIG. 9, the storage unit 150 stores the priority of the characteristic information and the information related to the network slice as the communication control information in association with each other. For example, in a case where the low-latency characteristic is low (Low), the large-capacity characteristic is low (Low), and the multiple-access characteristic is high (High), the "Slice 10" is used as the network slice.

(Control Unit 160)

Returning to FIG. 3. The acquisition unit 161 of the control unit 160 includes a service information acquisition unit 161a, a scene information acquisition unit 161b, and a characteristic information acquisition unit 161c.

The service information acquisition unit 161a acquires service information related to a service provided by the application unit 110 from the terminal device 20. For example, in a case where the application unit 110 provides a game service, the service information acquisition unit 161a acquires information related to a sub-category of a game from the terminal device 20 via the communication unit 140.

The scene information acquisition unit 161b acquires scene information from the terminal device 20 via the communication unit 140. The scene information acquisition unit 161b acquires, for example, information indicating whether the scene image displayed on the screen of the terminal device 20 is a menu scene which is a menu image or a play scene which is a play image.

The characteristic information acquisition unit 161c acquires characteristic information based on the service information and the scene information. For example, in a case where the service information is "PvP fighting game" and the scene information is "play", the characteristic information acquisition unit 161c refers to the storage unit 150 to acquire information that the low-latency characteristic is high (High) and the large-capacity characteristic is low (Low) (refer to FIG. 6).

The buffer control unit 162 illustrated in FIG. 3 controls the buffer amounts of the buffers 131 and 141 based on the characteristic information acquired by the characteristic information acquisition unit 161c. The buffer control unit 162 refers to the storage unit 150, for example, and determines the buffer amount corresponding to the priority of the characteristic information.

The buffers 131 and 141 temporarily accumulate data for encoding processing and communication processing. Accordingly, the longer the time during which the data is accumulated, the more the transmission of the data is delayed, leading to transmission latency. Therefore, one way to reduce the data transmission latency would be reducing the buffer amount of the buffers 131 and 141.

However, in practice, in order to transmit and receive data, the information processing device 10 needs to convert data into various formats and adjust data transmission or reception timings, and thus needs to have the buffers 131 and 141 of a certain buffer amount.

For example, in a case where the priority of the low-latency characteristic is high, the buffer control unit 162 controls the buffers 131 and 141 to have a first buffer amount B1 which is a small buffer amount. With a small buffer amount, it is possible to divide the transmission data into small portions, leading to reduction of the accumulation time in the buffers 131 and 141 and a higher transmission speed.

In a case where the priority of the large-capacity (high image quality) characteristic is high, the buffer control unit 162 controls the buffers 131 and 141 to have a second buffer amount B2 (B1<B2) which is a large buffer amount. In a case where the priority of the large-capacity characteristic is high, it is preferable to collectively process data to some extent in order to efficiently transmit the data. Therefore, in a case where the priority of the large-capacity characteristic is high, the buffer control unit 162 increases the buffer amount as compared with a case where the priority of the low-latency characteristic is high. This makes it possible for the information processing device 10 to transmit high-quality image data.

In a case where the priority of the multiple-access characteristic is high, a large quantity of players (terminal devices 20) play a game. Accordingly, the data to be transmitted has a small size in many cases, and the buffer amount for data processing need not be so large. On the other hand, it is important to control a communication timing for execution of communication with a large quantity of terminal devices 20. This might produce a waiting time for adjustment of the communication timings, requiring a certain buffer amount to accommodate the waiting time.

In view of this, in a case where the priority of the multiple-access characteristic is high, the buffer control unit 162 controls the buffers 131 and 141 to have the buffer amount of a third buffer amount B3 (B1<B3<B2) which is a middle level. This makes it possible for the information processing device 10 to transmit small-sized data while performing communication timing control.

As described below, the communication unit 140 includes first to third communication processing units 140a to 140c, and each of the first to third communication processing units 140a to 140c includes buffers 141a to 141c, respectively. The buffer control unit 162 controls the buffer amount for each of the buffers 141a to 141c.

The communication control unit 163 controls processing related to communication performed by the communication unit 140 based on characteristic information acquired by the characteristic information acquisition unit 161c.

The communication control unit 163 refers to the storage unit 150 and selects a network slice to be used for communication in accordance with the characteristic information.

Furthermore, the communication control unit 163 selects a bandwidth to be used for communication. For example, in a case where the priority of the low-latency characteristic is high, the communication control unit 163 decreases the bandwidth used for communication to a first bandwidth W1.

This makes it possible for the information processing device 10 to easily secure a band, facilitating stable communication.

In a case where the priority of the large-capacity characteristic is high, the communication control unit 163 increases the bandwidth used for communication to a second bandwidth W2 (W1<W2). This makes it possible for the information processing device 10 to increase the amount of data to be transmitted at a time.

In a case where the priority of the multiple-access characteristic is high, the communication control unit 163 decreases the bandwidth used for communication to a third bandwidth W3 (W1<W3). This makes it possible for the information processing device 10 to easily secure a band, facilitating stable communication.

Furthermore, the communication control unit 163 selects a protocol to be used by the communication unit 140 based on the characteristic information. An example of the protocol used by the communication unit 140 will be described below.

Note that the communication control unit 163 can control encoding processing in the encoding unit 130 and rendering processing in the rendering processing unit 120 in addition to the communication processing in the communication unit 140.

For example, when scene image compression performed by the encoding unit 130 is performed with high compression rate, or when the scene image has high resolution and high image quality, the encoding processing takes time, leading to an increased transmission latency.

To handle this, in a case where the priority of the low-latency characteristic is high, the communication control unit 163 decreases the compression rate of the compression processing performed by the encoding unit 130 to a first compression rate C1. Furthermore, the communication control unit 163 reduces the resolution after the compression processing performed by the encoding unit 130 to a first resolution R1 (low resolution). This makes it possible for the information processing device 10 to shorten the time of the compression processing performed by the encoding unit 130, leading to reduction of the transmission latency.

In a case where the priority of the large-capacity characteristic is high, the communication control unit 163 increases the compression rate of the compression processing performed by the encoding unit 130 to a second compression rate C2 (C1<C2). Furthermore, the communication control unit 163 increases the resolution after the compression processing performed by the encoding unit 130 to a second resolution R2 (R1<R2) (high resolution) This makes it possible for the information processing device 10 to transmit image data with high image quality.

In a case where the priority of the multiple-access characteristic is high, for example, the communication control unit 163 sets the compression rate of the compression processing performed by the encoding unit 130 to a third compression rate C3 (C1≤C3<C2) which is a low or middle rate. Furthermore, the communication control unit 163 sets the resolution after the compression processing performed by the encoding unit 130 to a third resolution R3 (R1≤R3<R2) which is a low or middle resolution, for example. This makes it possible for the information processing device 10 to transmit image data of a small or middle size, leading to reduction of transmission latency.

In addition to the compression rate and the resolution described above, the communication control unit 163 can also control the frame rate and the bit rate, for example, according to the characteristic information.

For example, increasing the frame rate results in a shortened time interval for each frame and reduction of the transmission latency. On the other hand, increasing the frame rate also increases the bit rate, taking more time for encoding processing and communication processing.

To handle this, in a case where the priority of the low-latency characteristic is high, the communication control unit 163 increases the frame rate after the compression processing performed by the encoding unit 130 to a first frame rate FR1, for example. In addition, the communication control unit 163 lowers the bit rate to a first bit rate BR1, for example. For example, the communication control unit 163 reduces the resolution of the image data to reduce the bit rate.

In a case where the priority of the large-capacity characteristic is high, the communication control unit 163 decreases the frame rate after the compression processing performed by the encoding unit 130 to a second frame rate FR2 (FR1>FR2), for example. In addition, the communication control unit 163 increases the bit rate to a second bit rate BR2 (BR1<BR2), for example. For example, the communication control unit 163 increases the resolution of the image data to increase the bit rate.

In a case where the priority of the multiple-access characteristic is high, for example, the communication control unit 163 sets the frame rate after the compression processing performed by the encoding unit 130 to a third frame rate FR3 (FR1 FR3>FR2), which is a middle or high rate. In addition, the communication control unit 163 sets the bit rate to the third bit rate BR3 (BR1≤BR3<BR2) which is a low or middle rate, for example. For example, the communication control unit 163 adjusts the resolution of the image data to adjust the bit rate.

(Rendering Processing Unit 120)

The rendering processing unit 120 generates image data in accordance with an instruction from the control unit 160. The rendering processing unit 120 outputs the generated image data to the encoding unit 130.

(Encoding Unit 130)

The encoding unit 130 is, for example, a video encoder that performs compression processing on the image data generated by the rendering processing unit 120. In accordance with an instruction from the control unit 160, the encoding unit 130 compresses the image data at a compression rate, a frame rate, and a bit rate according to the characteristic information and generates compressed data. The encoding unit 130 outputs the generated compressed data to the communication unit 140.

(Communication Unit 140)

The communication unit 140 processes the compressed data in accordance with an appropriate communication protocol for transmitting the compressed data and generates transmission data. The communication unit 140 includes first to third communication processing units 140a to 140c. For example, the first and second communication processing units 140a and 140b perform communication processing for video transmission, while the third communication processing unit 140c performs communication processing according to a transmission path.

The first communication processing unit 140a generates a video transmission stream in accordance with a Real-time Transport Protocol (RTP), for example. RTP is a protocol often used for audio/video transmission. In actual video transmission, RTP is often used in combination with another protocol such as RTP Control Protocol (RTCP) that performs communication quality control and the like. Here, however, in order to simplify the description, a case of using RTP will be described.

RTP is a protocol that basically forms video data (compressed data) into a predetermined format and converts the data into a format that is easy to transmit. At this time, according to the RTP, in addition to the video data, a timestamp indicating the sampled time of the video data and a sequence number indicating the order of RTP packets are formed into a format. The timestamp and the sequence number are used, for example, for the reception side to determine data loss during transmission or the timing of reproduction of the moving image.

The first communication processing unit 140*a* temporarily accumulates video data and the like using the buffer 141*a* having its buffer amount adjusted by the control unit 160, and generates a video transmission stream (RTP Packet).

The first communication processing unit 140*a* outputs the generated first communication data (for example, a video transmission stream) to the second communication processing unit 140*b*.

The second communication processing unit 140*b* generates transmission data (second communication data) according to the communication protocol. For example, the image data is transmitted to the terminal device 20 via an IP network. The IP network is a network also referred to as the Internet. The RTP packet is usually transmitted to the terminal device 20 by using a Transmission Control Protocol (TCP) or a User Datagram Protocol (UDP) and then using an Internet Protocol (IP).

Both TCP and UDP are protocols designed to reliably transmit data from a transmission side to a reception side via the Internet using information such as a source address and a destination address necessary for Internet communication based on the IP. Comparing TCP and UDP, TCP enables data transmission with higher reliability. Compared with TCP, UDP enables data transmission with lower latency. UDP is generally used in many cases where RTP is used. Therefore, a case where the second communication processing unit 140*b* generates transmission data by using UDP will be described below.

Figure 10:
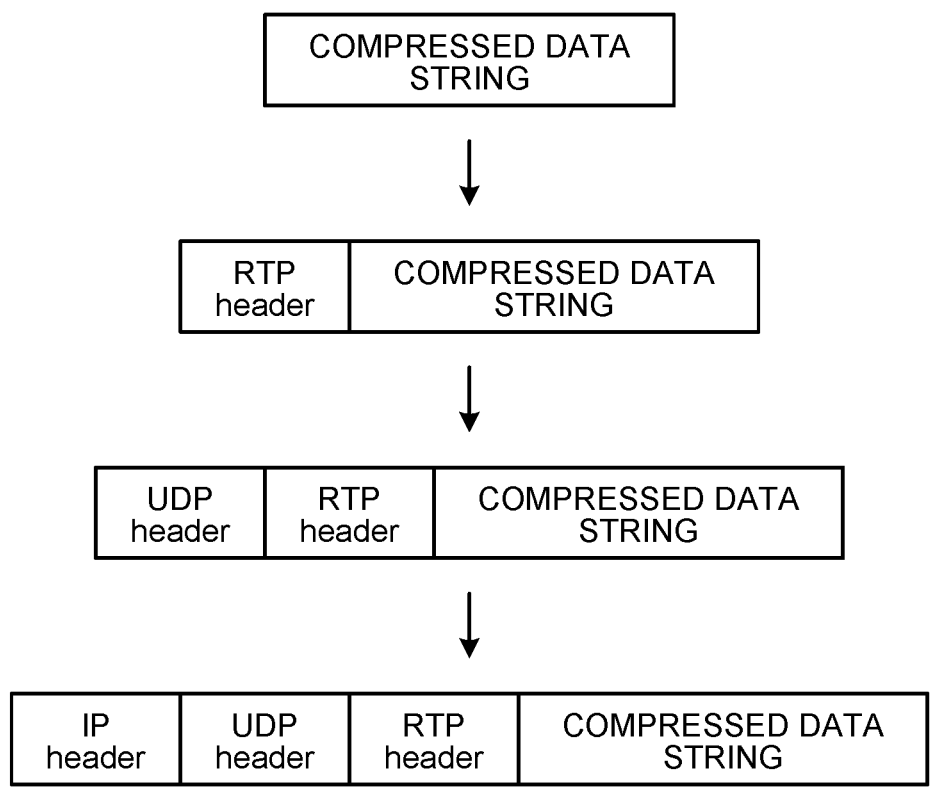
FIG. 10 is a diagram illustrating transmission data generated by a communication unit according to an embodiment of the present disclosure.

FIG. 10 is a diagram illustrating transmission data generated by the communication unit 140 according to the embodiment of the present disclosure.

As illustrated in FIG. 10, the first communication processing unit 140*a* performs RTP processing on a compressed data string generated by the encoding unit 130, and adds an RTP header to the compressed data string to generate an RTP packet. The RTP packet is output to the second communication processing unit 140*b*.

The second communication processing unit 140*b* adds a UDP header to the RTP packet to generate a UDP packet. The UDP header includes information related to an Internet transmission port, for example. The port is a data doorway number inside the device (information processing device 10).

Next, the second communication processing unit 140*b* adds an IP header to the UDP packet to generate an IP packet. The IP header includes a source address and a destination address for Internet transmission, for example.

The second communication processing unit 140*b* temporarily accumulates each packet or the like using the buffer 141*b* having its buffer amount adjusted by the control unit 160, and generates an IP packet. The second communication processing unit 140*b* outputs the generated IP packet to the third communication processing unit 140*c*.

Although the second communication processing unit 140*b* generates a UDP packet using UDP, the generation is not limited thereto. For example, the second communication processing unit 140*b* may generate a TCP packet by using TCP. In this case, the first communication processing unit 140*a* may generate the first communication data using a protocol other than RTP.

Alternatively, the second communication processing unit 140*b* may change the protocol based on characteristic information. For example, the second communication processing unit 140*b* may select UDP in a case where the priority of the low-latency characteristic is high, and may select TCP in a case where the priority of the large-capacity characteristic is high. In this case, the first communication processing unit 140*a* may change the protocol to be used according to the protocol selected by the second communication processing unit 140*b*.

Returning to FIG. 3. The third communication processing unit 140*c* performs processing corresponding to a transmission physical medium on the IP packet to generate a transmission signal. The third communication processing unit 140*c* transmits the generated transmission signal to the terminal device 20.

Here, the transmission physical medium is a network to which the information processing device 10 and the terminal device 20 are connected, and examples thereof include Ethernet, 5G, and 4G. The third communication processing unit 140*c* performs signal processing on the IP packet according to the type of network to generate and transmit a transmission signal. For example, the 5G network uses the above-described network slice technology to implement communication satisfying the low-latency characteristic and the large-capacity characteristic. The third communication processing unit 140*c* transmits the transmission signal using, for example, the network slice selected by the control unit 160.

The third communication processing unit 140*c* temporarily accumulates each packet or the like using the buffer 141*c* having its buffer amount adjusted by the control unit 160, and generates a transmission signal. The third communication processing unit 140*c* transmits the generated transmission signal to the terminal device 20.

Since the conventional application server has not conducted communication control in consideration of characteristics of a service to be provided, making it difficult to perform efficient communication control according to the characteristics of the service. This has caused occurrence of congestion when the communication amount increases, having a possibility of occurrence of latency in data communication or data loss during the communication. In this manner, it has been difficult for the conventional application server (information processing device) to provide a stable quality service.

In view of this, the information processing device 10 according to the embodiment of the present disclosure acquires characteristic information of the service to be provided from the terminal device 20, and changes the processing related to communication based on the acquired characteristic information. This makes it possible for the information processing device 10 to perform communication processing according to the characteristic information, leading to achievement of efficient communication control. This makes it possible for the information processing device 10 to provide stable quality service to the terminal device 20.

Furthermore, in addition to the communication processing of the communication unit 140, the encoding processing in the encoding unit 130, the buffer amount, and the like are to be also controlled by the information processing device 10 based on the characteristic information. For example, when the information processing device 10 performs control only as communication control of communication related to a network, it would just improve characteristics resulting from a transmission path (network) but would not improve characteristics resulting from the encoding processing, for example. Specifically, even when the information processing device 10 selects a network slice to reduce the latency on the network, the data transmission latency as a whole cannot be reduced in the presence of prolonged encoding processing.

In view of this, the information processing device 10 according to the embodiment of the present disclosure performs controls as the communication control processing on the buffer amount, the encoding processing, and the like based on the characteristic information in addition to the control on the communication processing of the communication unit 140. This makes it possible for the information processing device 10 to perform communication that satisfies characteristics required for services, and to provide stable quality services to the terminal device <2.3. Terminal Device>

Figure 11:
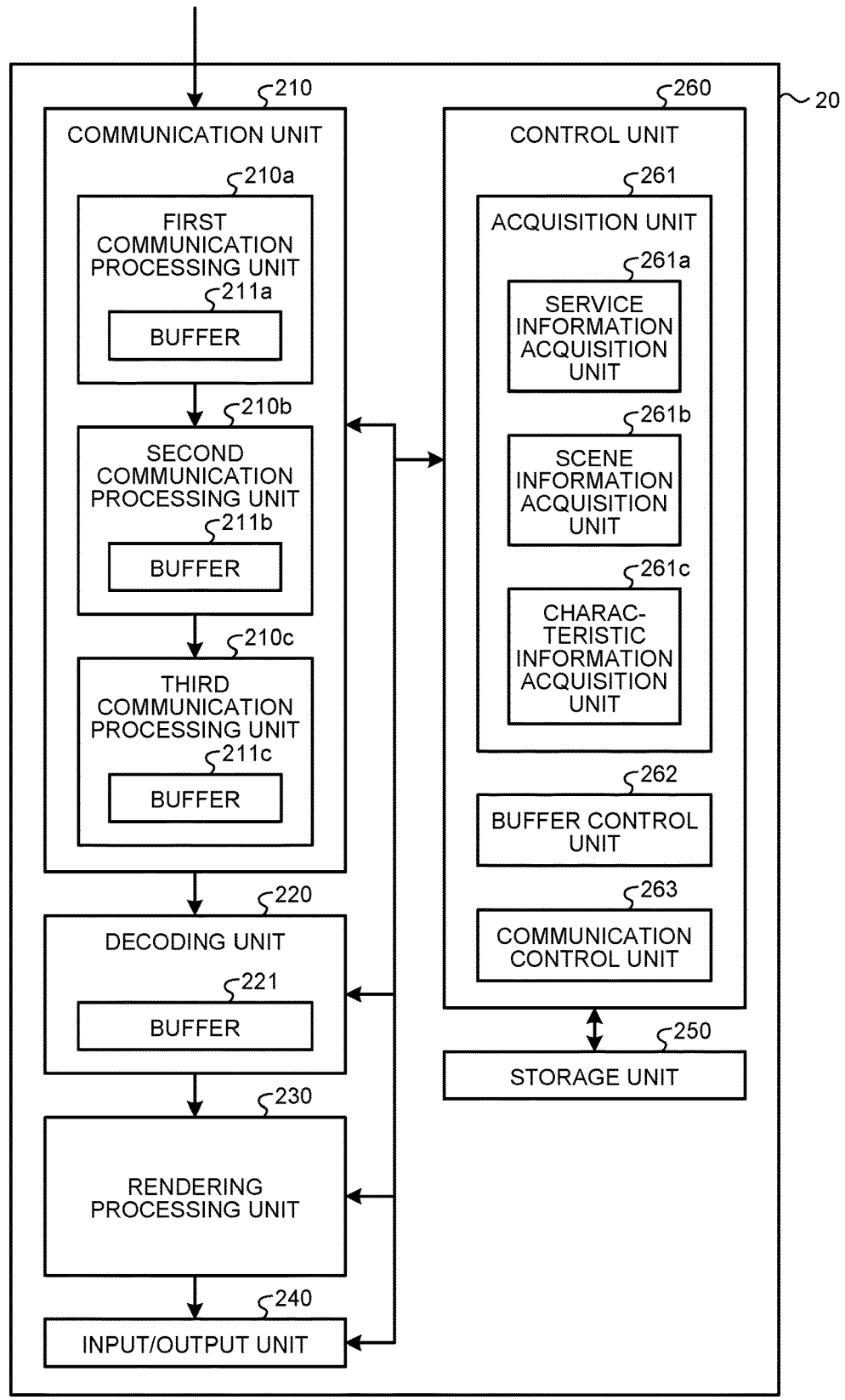
FIG. 11 is a diagram illustrating an example of a configuration of a terminal device according to the embodiment of the present disclosure.

FIG. 11 is a diagram illustrating an example of a configuration of the terminal device 20 according to the embodiment of the present disclosure.

(Storage Unit 250)

The storage unit 250 stores a game service provided from the application unit 110.

(Control Unit 260)

The acquisition unit 261 of the control unit 260 includes a service information acquisition unit 261a, a scene information acquisition unit 261b, and a characteristic information acquisition unit 261c.

The service information acquisition unit 261a acquires service information related to the service provided from the application unit 110 from the storage unit 250, for example. For example, in a case where the application unit 110 provides a game service, the service information acquisition unit 261a acquires information related to a sub-category of a game. The service information acquisition unit 261a notifies the information processing device 10 of the acquired service information.

The scene information acquisition unit 261b acquires scene information. The scene information acquisition unit 261b acquires scene information from the input/output unit 240, for example. The scene information acquisition unit 261b notifies the information processing device 10 of the acquired scene information. The characteristic information acquisition unit 261c acquires characteristic information from the information processing device 10.

The buffer control unit 262 controls the buffer amounts of the buffers 211 and 221 based on the characteristic information acquired by the characteristic information acquisition unit 261c. The buffer control unit 262 refers to the storage unit 250, for example, and determines the buffer amount corresponding to the priority of the characteristic information. Note that the specific buffer control is the same as the control performed by the buffer control unit 162 of the information processing device 10, and thus description thereof is omitted.

As described below, the communication unit 210 includes first to third communication processing units 210a to 210c, and each of the first to third communication processing units 210a to 210c includes buffers 211a to 211c, respectively. The buffer control unit 262 controls the buffer amount for each of the buffers 211a to 211c.

The communication control unit 263 controls processing related to communication performed by the communication unit 210 based on the characteristic information acquired by the characteristic information acquisition unit 261c.

The communication control unit 263 selects a protocol to be used by the communication unit 210 based on the characteristic information. The communication control unit 263 selects a protocol used by the information processing device 10.

Note that the communication control unit 263 can control encoding processing in the decoding unit 220 and rendering processing in the rendering processing unit 230 in addition to the communication processing in the communication unit 210.

For example, the communication control unit 263 selects a compression rate to be used by the decoding unit 220 based on the characteristic information. The communication control unit 263 selects the compression rate used in the encoding processing of the information processing device 10. Similarly, the communication control unit 263 selects the frame rate or the bit rate used in the encoding processing of the information processing device 10 based on the characteristic information.

(Communication Unit 210)

The communication unit 210 processes the reception signal received from the information processing device 10 according to an appropriate communication protocol to generate compressed data. The communication unit 210 includes first to third communication processing units 210a to 210c. For example, the first communication processing unit 210a performs communication processing according to the transmission path, and the second and third communication processing units 210b and 210c perform communication processing for video transmission.

The first communication processing unit 210a performs processing according to the transmission physical medium on the reception signal received, and generates an IP packet. The first communication processing unit 210a outputs the generated IP packet to the second communication processing unit 210b.

The first communication processing unit 210a temporarily accumulates the reception signal and the like using the buffer 211a having its buffer amount adjusted by the control unit 260, and generates an IP packet.

Second communication processing unit 210b generates the first communication data (video stream) from the IP packet according to the communication protocol. As described above, when the information processing device 10 generates the IP packet using the IP and UDP, the second communication processing unit 210b also generates the first communication data from the IP packet based on the IP and UDP.

The second communication processing unit 210b generates a UDP packet based on an IP header added to the IP packet, for example. The second communication processing unit 210b generates an RTP packet based on the UDP header added to the UDP packet.

The second communication processing unit 210b temporarily accumulates each packet or the like using the buffer 211b having its buffer amount adjusted by the control unit 260, and generates an RTP packet. The second communication processing unit 210b outputs the generated RTP packet to the third communication processing unit 210c.

The third communication processing unit 210c generates compressed data according to the RTP, for example. The third communication processing unit 210c temporarily accumulates RTP packets and the like using the buffer 211c having its buffer amount adjusted by the control unit 260, and generates compressed data.

(Decoding Unit 220)

The decoding unit 220 is, for example, a video decoder that performs decompression processing of decompressing the compressed data generated by the communication unit 210 and generates image data. In accordance with an instruction from the control unit 160, the decoding unit 220 decompresses the compressed data at a compression rate, a frame rate, and a bit rate according to the characteristic information, and generates image data. The decoding unit 220 outputs the generated image data to the rendering processing unit 230.

(Rendering Processing Unit 230)

The rendering processing unit 230 performs rendering processing on the image data in accordance with an instruction from the control unit 260, and outputs the processed image data to the input/output unit 240.

In this manner, the terminal device 20 according to the embodiment of the present disclosure acquires the characteristic information of the service to be provided, and changes the processing related to communication based on the acquired characteristic information. This makes it possible for the terminal device 20 to perform communication processing according to the characteristic information, leading to achievement of efficient communication control. This makes it possible for the terminal device 20 to obtain stable quality service.

Furthermore, as the communication control processing, the terminal device 20 also controls the buffer amount, the decoding processing, and the like based on the characteristic information in addition to the communication processing by the communication unit 210. This makes it possible for the terminal device 20 to perform communication satisfying the characteristics required for the service, and to obtain stable quality service.

3. COMMUNICATION PROCESSING

<3.1. Communication Processing by Information Processing Device>

FIG. 12 is a flowchart illustrating a flow of communication processing executed by the information processing device 10 according to the embodiment of the present disclosure. The information processing device 10 repeatedly executes the communication processing illustrated in FIG. 12 at a predetermined cycle while providing a service to the terminal device 20. Alternatively, the information processing device 10 may execute the communication processing illustrated in FIG. 12 at a timing when the scene is switched.

As illustrated in FIG. 12, the information processing device 10 acquires scene information (step S101). The information processing device 10 acquires scene information related to a scene of a game from the terminal device 20, for example. The information processing device may acquire the service information indicating the type of the game from the terminal device 20 in addition to the scene information.

The information processing device 10 acquires characteristic information required for service provision based on the scene information and the service information (step S102). The characteristic information includes a low-latency characteristic, a large-capacity characteristic, and a multiple-access characteristic, for example. Alternatively, the characteristic information may be information indicating the priority of these characteristics.

Based on the characteristic information, the information processing device 10 changes the buffer amounts of the buffers 131 and 141 used for data transmission (step S103). The information processing device 10 changes the communication processing for data transmission (step S104). The information processing device 10 changes parameters used for communication, such as a network slice and a bandwidth. Furthermore, the information processing device changes parameters related to communication data generation, such as a compression rate and a data rate, for example.

The information processing device 10 generates transmission data using the changed buffer, parameter, and the like (step S105), and transmits the generated transmission data (step S106).

<3.2. Communication Processing by Terminal Device>

FIG. 13 is a flowchart illustrating a flow of communication processing executed by a terminal device 20 according to the embodiment of the present disclosure. While receiving the service from the information processing device 10, the terminal device 20 repeatedly executes the communication processing illustrated in FIG. 13 at a predetermined cycle. Alternatively, the terminal device 209 may execute the communication processing illustrated in FIG. 13 at a timing when the scene is switched.

As illustrated in FIG. 13, the terminal device 20 acquires scene information (step S201). The terminal device 20 acquires scene information related to a scene of a game from the input/output unit 240, for example. The terminal device 20 may acquire service information indicating the type of the game from the storage unit 250 in addition to the scene information.

The terminal device 20 acquires characteristic information from the information processing device 10 (step S102). The characteristic information includes a low-latency characteristic, a large-capacity characteristic, and a multiple-access characteristic, for example. Alternatively, the characteristic information may be information indicating the priority of these characteristics. The terminal device 20 notifies the information processing device 10 of the scene information and the service information acquired in step S201, thereby acquiring the characteristic information.

The terminal device 20 changes the buffer amounts of the buffers 131 and 141 used for data reception based on the characteristic information (step S203). The terminal device 20 changes the communication processing for data reception (step S204). Furthermore, the terminal device 20 changes parameters related to data decoding such as a compression rate and a data rate, for example.

The terminal device 20 receives the received data using the changed buffer, parameter, and the like (step S205), and decodes the reception data received (step S206).

4. OTHER EMBODIMENTS

The above-described embodiment is an example, and various modifications and applications are possible.

Although the above-described embodiment has described the menu and the play as an example of the game scene, the game scene is not limited thereto. For example, the scene of the game may include an "explanatory video" scene demonstrating an operation method of the game, story of the game, and the like.

Furthermore, although the above-described embodiment is an example in which the terminal device 20 transmits the scene information related to the scene to the information processing device 10, the terminal device 20 may transmit the scene information using TCP at this time. The scene information is also information indicating the progress status of the game, which is information that should be transmitted with higher reliability even though the amount of data is small. Therefore, the terminal device 20 transmits the scene information using TCP unlike video transmission using UDP. As described above, TCP is a protocol for transmitting data with higher reliability, as compared with UDP. Therefore, with IP transmission of the scene information using TCP, the terminal device 20 can transmit the scene information with higher reliability to the information processing device 10.

Furthermore, although the above-described embodiment is an exemplary configuration in which the control units 160 and 260 control the buffer amount of each processing unit based on scene information, the configuration is not limited thereto. Each processing unit may acquire scene information and control the buffer amount. For example, in the information processing device the encoding unit 140 and the communication unit 140 may individually acquire scene information and control the buffer amounts of the buffers 131 and 141, respectively.

Furthermore, although the above-described embodiment has described an exemplary configuration in which the terminal device 20 determines a scene based on image data to be presented to the user, operation information performed by the user, or the like, and generates and transmits scene information, the configuration is not limited to this. For example, the terminal device 20 may transmit operation information performed by the user to the information processing device 10. In this case, for example, the application unit 110 of the information processing device 10 determines a scene based on the operation information and generates scene information. The control unit 160 of the information processing device 10 and the control unit 260 of the terminal device 20 acquire the scene information from the application unit 110.

Furthermore, although the above-described embodiment is an example in which the information processing device 10 is a game server, and a game service is provided to the user as an application function, the device is not limited thereto. The information processing device 10 may be an application server that provides an application function other than a game. Furthermore, the information processing device 10 may be a mobile body such as a robot or a drone.

In this case, the information processing device transmits image data captured by the mobile body to the terminal device 20 that steers the mobile body. The user steers the mobile body while confirming the image displayed on the terminal device 20. The information processing device 10 may perform communication control separately for a case where the mobile body is moving at a predetermined speed or higher (moving scene) and a case where the mobile body is stopped at a speed of 0 or slowly moving at a speed lower than a predetermined speed (stopping scene). For example, the information processing device 10 performs communication control such that image data is transmitted with a high priority for the low-latency characteristic in a moving scene, and such that image data is transmitted with a high priority for the large-capacity (high image quality) characteristic in a stop scene.

Furthermore, although the above-described embodiment is an example in which the information processing device 10 generates the characteristic information from the service information, the scene information, and the like acquired from the terminal device the acquisition of information is not limited thereto. For example, the information processing device 10 may acquire information related to a service to be provided to the terminal device 20, such as service information and scene information, from the application unit 110.

Furthermore, the terminal device 20 may acquire the characteristic information from the service information, the scene information, or the like. In this case, it is assumed that the storage unit 250 of the terminal device 20 is supposed to store the characteristic information and the like (refer to FIGS. 5, 6, etc.) similar to those of the storage unit 150 of the information processing device 10. The terminal device 20 refers to the storage unit 250 based on the acquired service information and scene information, and acquires the characteristic information.

Note that the storage unit 250 may preliminarily store association or the like of the service information and the characteristic information, or may acquire and store the service information and the characteristic information from the information processing device 10 via the control unit 260.

The control device that controls the information processing device 10 or the terminal device 20 of the present embodiment may be actualized by a dedicated computer system or by a general-purpose computer system.

For example, a program for executing the above-described operations is stored in a computer-readable recording medium such as an optical disk, semiconductor memory, a magnetic tape, or a flexible disk and distributed. For example, the program is installed on a computer and the above processing is executed to achieve the configuration of the control device. At this time, the control device may be a device (for example, a personal computer) outside the information processing device 10 or the terminal device 20. Furthermore, the control device may be a device (for example, the control unit 160 or the control unit 260) inside the information processing device or the terminal device 20.

Furthermore, the communication program may be stored in a disk device included in a server device on a network such as the Internet so as to be able to be downloaded to a computer, for example. Furthermore, the functions described above may be implemented by using operating system (OS) and application software in cooperation. In this case, the sections other than the OS may be stored in a medium for distribution, or the sections other than the OS may be stored in a server device so as to be downloaded to a computer, for example.

Furthermore, among individual processing described in the above embodiments, all or a part of the processing described as being performed automatically may be manually performed, or the processing described as being performed manually can be performed automatically by known methods. In addition, the processing procedures, specific names, and information including various data and parameters illustrated in the above Literatures or drawings can be arbitrarily altered unless otherwise specified. For example, various types of information illustrated in each of the drawings are not limited to the information illustrated.

In addition, each of components of each device is provided as a functional and conceptual illustration and thus does not necessarily need to be physically configured as illustrated. That is, the specific form of distribution/integration of each of the devices is not limited to those illustrated in the drawings, and all or a part thereof may be functionally or physically distributed or integrated into arbitrary units according to various loads and use conditions.

Furthermore, the above-described embodiments can be appropriately combined within a range implementable without contradiction of processes. Furthermore, the order of individual steps illustrated in the sequence diagram or the flowchart of the present embodiment can be changed as appropriate.

Furthermore, for example, the present embodiment can be implemented as any configuration constituting a device or a system, for example, a processor as a large scale integration (LSI) or the like, a module using a plurality of processors or the like, a unit using a plurality of modules or the like, and a set obtained by further adding other functions to the unit, or the like (that is, a configuration of a part of the device).

In the present embodiment, a system represents a set of a plurality of components (devices, modules (components), or the like), and whether all the components are in the same housing would not be a big issue. Therefore, a plurality of devices housed in separate housings and connected via a network, and one device in which a plurality of modules are housed in one housing, are both systems.

Furthermore, for example, the present embodiment can adopt a configuration of cloud computing in which one function is cooperatively shared and processed by a plurality of devices via a network.

5. SUPPLEMENTARY NOTES

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

Furthermore, the effects described in the present specification are merely illustrative or exemplary and are not limited. That is, the technology according to the present disclosure can exhibit other effects that are apparent to those skilled in the art from the description of the present specification in addition to or instead of the above effects.

Note that the present technique can also have the following configurations.

(1)
An information processing device that provides an application function to a client device, the information processing device comprising:
an acquisition unit that acquires characteristic information related to the application function; and
a communication unit that communicates with the client device, wherein
the communication unit changes processing related to the communication in accordance with the characteristic information.

(2)
The information processing device according to (1)a, wherein
the communication unit
changes the processing related to the communication based on the characteristic information according to scenes of the application function.

(3)
The information processing device according to (2), wherein
the communication unit
changes the processing related to the communication in accordance with a characteristic of communication quality required for each of the scenes.

(4)
The information processing device according to (2), wherein
the communication unit
changes the processing related to the communication in accordance with a quantity of the client devices to which the application function is provided.

(5)
The information processing device according to any one of (1) to (4), further comprising
a storage unit that stores the characteristic information, wherein
the acquisition unit
acquires the characteristic information from the storage unit.

(6)
The information processing device according to any one of (1) to (5), wherein
the communication unit
decreases a bandwidth used for the communication when a low latency is required and increases the bandwidth when a large capacity is required, based on the characteristic information.

(7)
The information processing device according to any one of (1) to (6), wherein
the communication unit
changes at least one of a frame rate and a bit rate of data to be transmitted to the client device in accordance with the characteristic information.

(8)
The information processing device according to any one of (1) to (7), wherein
the communication unit
changes a buffer amount of a buffer used for processing related to the communication, in accordance with the characteristic information.

(9)
The information processing device according to (8), wherein
the communication unit
decreases the buffer amount when a low latency is required and increases the buffer amount when a large capacity is required, based on the characteristic information.

(10)
An information processing device that receives provision of an application function from a client server, the information processing device comprising:
an acquisition unit that acquires characteristic information related to the application function; and
a communication unit that communicates with the client server, wherein
the communication unit changes processing related to the communication in accordance with the characteristic information.

(11)
A communication method for performing communication in an information processing device that provides an application function to a client device, the communication method comprising:
acquiring characteristic information related to the application function; and
communicating with the client device, wherein
the processing related to the communication is changed in accordance with the characteristic information in the communication with the client device.

(12)
A communication method for performing communication in an information processing device that receives provision of an application function from a client server, the communication method comprising:
   acquiring characteristic information related to the application function; and
   communicating with the client server, wherein processing related to the communication is changed in accordance with the characteristic information in the communication with the client server.

REFERENCE SIGNS LIST

10 INFORMATION PROCESSING DEVICE
20 Terminal device
30 BASE STATION DEVICE
110 APPLICATION UNIT
120, 230 RENDERING PROCESSING UNIT
130 ENCODING UNIT
140, 210 COMMUNICATION UNIT
150, 250 STORAGE UNIT
160, 260 CONTROL UNIT
161, 261 ACQUISITION UNIT
162, 262 BUFFER CONTROL UNIT
163, 263 COMMUNICATION CONTROL UNIT
220 DECODING UNIT
240 INPUT/OUTPUT UNIT

The invention claimed is:

1. An information processing device that provides an application function to a client device, the information processing device comprising:
   circuitry configured to
      acquire characteristic information related to the application function, the characteristic information including a low-latency characteristic, a large-capacity characteristic, and a multiple-access characteristic required for the application function, and
      perform communication with the client device; and
   a buffer used for processing related to the communication in accordance with the characteristic information,
wherein
the circuitry is further configured to
      control a buffer amount of the buffer to be a first buffer amount B1 under a condition that the low-latency characteristic has priority in accordance with the characteristic information,
      control the buffer amount to be a second buffer amount B2 which is larger than the first buffer amount B1 under a condition that the large-capacity characteristic has the priority in accordance with the characteristic information, and
      control the buffer amount to be a third buffer amount B3 which is larger than the first buffer amount B1 but smaller than the second buffer amount B2 under a condition that the multiple-access characteristic has the priority in accordance with the characteristic information.

2. The information processing device according to claim 1, wherein
the circuitry is further configured to control the buffer amount based on the characteristic information according to scenes of the application function.

3. The information processing device according to claim 2, wherein
the circuitry is further configured to control the buffer amount in accordance with a characteristic of communication quality required for each of the scenes.

4. The information processing device according to claim 1, further comprising a memory that stores the characteristic information, wherein
the circuitry is further configured to acquire the characteristic information from the memory.

5. The information processing device according to claim 1, wherein
the circuitry is further configured to decrease a bandwidth used for the communication when the low-latency characteristic has the priority and increase the bandwidth when the large-capacity characteristic has the priority, based on the characteristic information.

6. The information processing device according to claim 1, wherein
the circuitry is further configured to change at least one of a frame rate and a bit rate of data to be transmitted to the client device in accordance with the characteristic information.

7. A communication method for performing communication in an information processing device that provides an application function to a client device, the communication method comprising:
   acquiring characteristic information related to the application function, the characteristic information including a low-latency characteristic, a large-capacity characteristic, and a multiple-access characteristic required for the application function;
   communicating with the client device; and
   controlling a buffer amount of a buffer used for processing related to the communicating in accordance with the characteristic information in the communicating with the client device, wherein the controlling includes
   controlling the buffer amount to be a first buffer amount B1 under a condition that the low-latency characteristic has priority in accordance with the characteristic information;
   controlling the buffer amount to be a second buffer amount B2 which is larger than the first buffer amount B1 under a condition that the large-capacity characteristic has the priority in accordance with the characteristic information; and
   controlling the buffer amount to be a third buffer amount B3 which is larger than the first buffer amount B1 but smaller than the second buffer amount B2 under a condition that the multiple-access characteristic has the priority in accordance with the characteristic information.

* * * * *